Jan. 28, 1941.　　　J. W. JENSEN　　　2,230,060
POWER DRIVE FOR IRONING MACHINES
Filed April 2, 1937　　　8 Sheets-Sheet 4

Inventor:
Joseph W. Jensen

Jan. 28, 1941. J. W. JENSEN 2,230,060
POWER DRIVE FOR IRONING MACHINES
Filed April 2, 1937 8 Sheets-Sheet 6

Inventor:
Joseph W. Jensen
By: A. W. Molinare, Atty.

Jan. 28, 1941.    J. W. JENSEN    2,230,060
POWER DRIVE FOR IRONING MACHINES
Filed April 2, 1937    8 Sheets-Sheet 7

Inventor:
Joseph W. Jensen
By A. W. Molinare, Atty.

Jan. 28, 1941. J. W. JENSEN 2,230,060
POWER DRIVE FOR IRONING MACHINES
Filed April 2, 1937 8 Sheets-Sheet 8

Inventor:
Joseph W. Jensen
By: A. M. Molinare

Patented Jan. 28, 1941

2,230,060

UNITED STATES PATENT OFFICE 2,230,060

POWER DRIVE FOR IRONING MACHINES

Joseph W. Jensen, Chicago, Ill., assignor to Electric Household Utilities Corporation, Chicago, Ill., a corporation of Illinois Application April 2, 1937, Serial No. 134,541

14 Claims. (Cl. 38—60)

This invention relates to ironing machines of the type adapted for domestic use, comprising a rotatable roll and a cooperating shoe adapted to be moved toward and away from the roll.

More particularly, the present invention is directed to a novel and improved driving and control mechanism for the roll and the shoe. Such mechanisms as embodied in commercial machines of this type usually include a manually operable control for the operation of the roll, and a manually operable separate control for moving the shoe toward and from the roll. This latter control also includes mechanism interconnecting with the roll control which normally causes rotation of the roll when the shoe arrives in cooperating relation thereto (unless said roll driving connections are disengaged by the first control) and causes arresting of the roll as the shoe commences to move away from the roll. When the first mentioned control is adjusted in one position the roll drive connections become disengaged so that upon operation of the second-mentioned control the shoe is moved either toward or away from the roll, and the roll remains stationary and serves as a "buck" with which the shoe cooperates for performing a pressing operation.

In a normal ironing operation the roll is rotated during the time that the shoe is in cooperating engagement therewith, and the fabric is fed by the roll over the heated surface of the shoe. It is recognized that it is essential to performing a proper ironing operation that the fabrics or clothes be dampened preliminary to the ironing operation, and frequently some articles or certain areas of articles are inadvertently dampened to a greater degree than other areas. Obviously, to perform a satisfactory ironing operation on the entire article it is necessary that said excessively damp areas remain in contact with the heated shoe for a longer period of time to remove the excess moisture. This may be accomplished by operating the first mentioned control so that the roll remains stationary for a desired period of time with the fabric or clothes engaged between the shoe and the roll. If desired, the ironer may be manipulated in a pressing manner, that is, the shoe may be moved into and out of cooperative relation to the roll and the fabric or clothes, adjusted and readjusted on the roll as desired.

One of the objects of this invention is to provide a novel and improved driving and control mechanism of the character indicated which is simple, compact, positive in operation and capable of being economically manufactured.

Another object is to provide an improved driving and control mechanism of the character indicated wherein several of the operating elements are combined in a unitary assembly to permit quick and easy assembly in the mechanism housing and which facilitates repair or replacement of certain parts of the driving mechanism.

A further object resides in the provision of an improved driving and control mechanism of the character indicated wherein various control and driving elements are coaxially mounted to produce a compact construction which permits convenient assembly and embodiment in a relatively small housing.

Other objects and advantages of the present invention will be apparent from the following description, taken in connection with the accompanying drawings in which:

Fig. 6 is an end view, part in section, of the roll and driving mechanism, taken as indicated at line 6—6 on Fig. 1.

Figure 1:
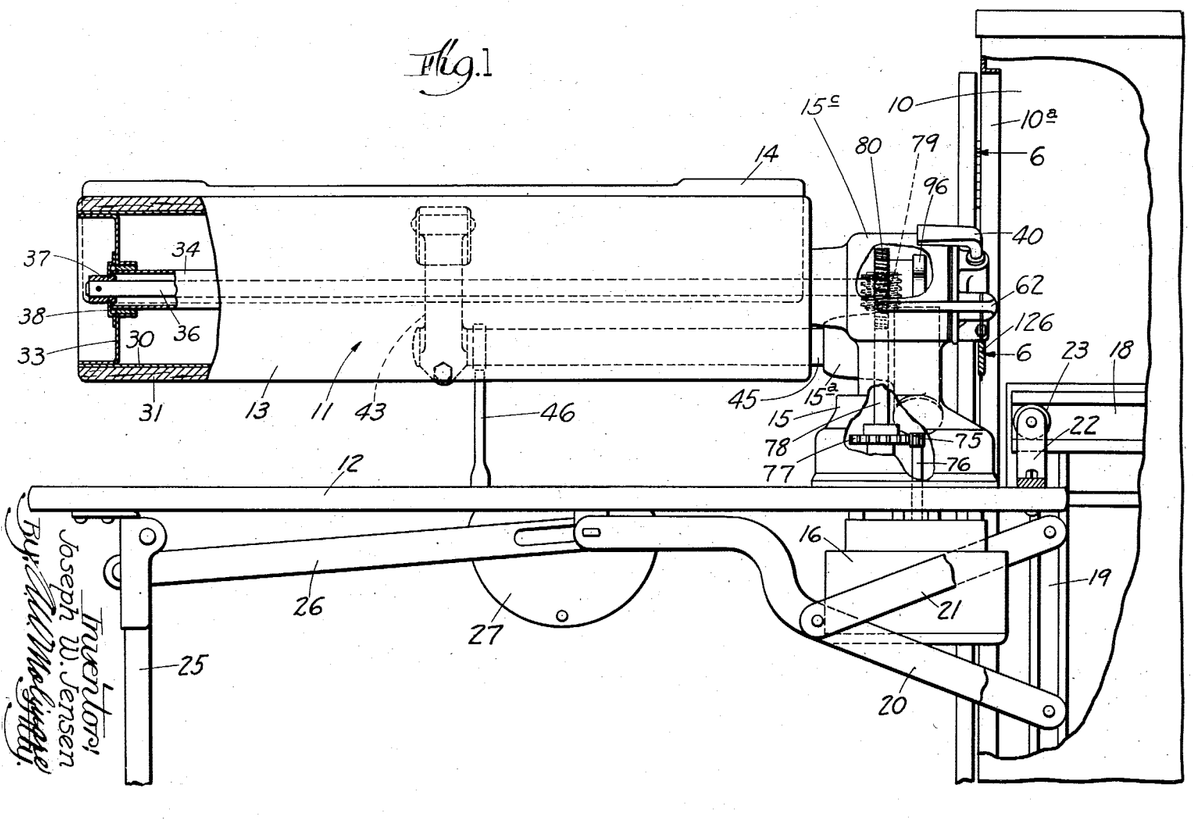
Fig. 1 is a fragmentary view in side elevation of a domestic type ironing machine embodying the present invention; parts being broken away to show details of construction.

For purposes of illustration, the present invention is herein disclosed in connection with an ironing machine of the folding type wherein the ironer mechanism is associated with a cabinet in a manner which permits it to be folded within the cabinet when not in use or withdrawn into operating position outside of the cabinet as seen in Fig. 1 of the drawings. It is to be understood, however, that the present invention is not to be limited to the particular type of ironer herein disclosed as manifestly the invention is readily adaptable to other types of ironer units, such as the portable type or the table type unit.

In the drawings, 10 indicates a cabinet of substantially rectangular box-like form and 11— an ironer mechanism mounted on a baseboard 12, the ironer mechanism and baseboard being movable together as a unit for folding within the cabinet when not in use. The ironer mechanism comprises a roll, 13, and a cooperating shoe 14, the former being carried by a housing or standard 15 mounted on the inner end of the baseboard 12, as seen in Fig. 1. The ironer mechanism is driven by an electric motor housed within a casing 16 secured to the under side of the baseboard 12. If desired, the standard 15 may be designed so that the motor may be directly associated therewith on the upper side of the baseboard 12. The standard or housing 15 contains suitable drive and control mechanism for connecting the motor to the roll and for moving the shoe into and out of cooperating relation to the roll as hereinafter described.

The cabinet 10 is provided with a door opening 10ª through which the ironer unit passes when it is moved into and out of the cabinet. Suitable means is provided for guiding the ironer unit during such movement to fold the same in vertical position when moved completely into the cabinet and to unfold the same in horizontal position as seen in Fig. 1 when entirely withdrawn from the cabinet. Although the mechanism for performing these functions constitutes no part of the present invention, it will be briefly described as follows:

The ironer unit is guided in its movement by rails 18 and 19 which may be understood to be duplicated on opposite side walls of the cabinet, and links 20 and 21, cooperate with the rail 19, while supporting struts 22, carried at opposite sides of the inner end of the baseboard 12 is provided with rollers 23 which travel in the channel rails 18. In the extended position of the ironer unit the inner end of the baseboard 12 is supported from the rails 18 by the struts 22, and the outer end of the baseboard 12 is supported by a foldable hinged leg 25, which may be folded against the under side of the baseboard 12 when the ironer unit is disposed in folded position in the cabinet 10. The folding of the leg 25 is automatically accomplished during the movement of the ironer into the cabinet 10, and any suitable mechanism may be employed for this purpose. In the drawings, this mechanism includes a link 26 connected to the leg and operated by a cam 27 which, in turn, is actuated by the link 28.

Figure 3:
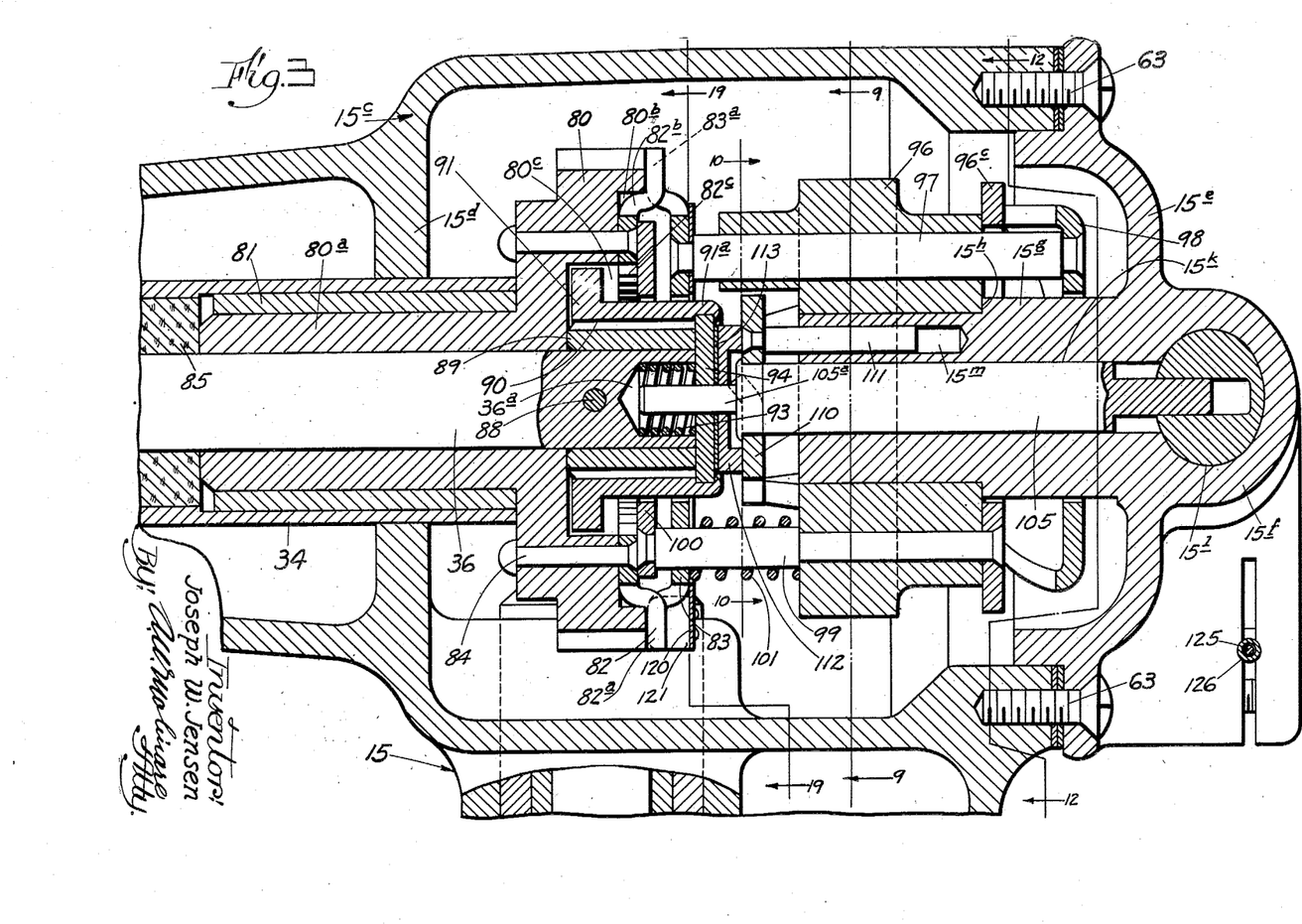
Fig. 3 is a sectional view similar to Fig. 2 showing the mechanism in a position of adjustment at which the shoe is moving into engagement with the roll and the roll is stopped, or a position at which the roll has just been arrested and the shoe is commencing to move away from the roll.

The roll 13 is of conventional construction including a tubular metallic supporting body 30 around which is wrapped one or more layers of resilient material or padding 31 which may be understood to be covered by an outer jacket or wrapper of suitable fabric such as muslin. Mounted in opposite ends of the tubular body 30 are dish shaped elements, 33 having journaled support on a stationary tubular sleeve 34, extending longitudinally and centrally in the tubular body. Said sleeve 34 is rigidly anchored at one end in the housing 15 as seen in Fig. 3 of the drawings, and thus serves to provide journaled support for the roll 13. Extending longitudinally through the tubular sleeve 34 is a roll drive shaft 36, one end of which extends into the housing 15 and is detachably engaged by the driving mechanism in said housing, while the opposite end of said shaft extends beyond the dished end plate 33 at the outer or unsupported end of the roll. Rigidly mounted on said outer end of the shaft 36 is a sleeve 37 having a flange 38 rigidly attached to said end plate 33 so that rotation of the shaft 36 is transmitted through the sleeve 37 and flange 38 and element 33 for rotating the roll. The drive mechanism contained in the housing 15 and adapted for rotating the roll shaft 36 when in operation, as hereinafter described, is manually controlled by the control member 40 associated with said drive mechanism.

Figures 9, 10, 11:
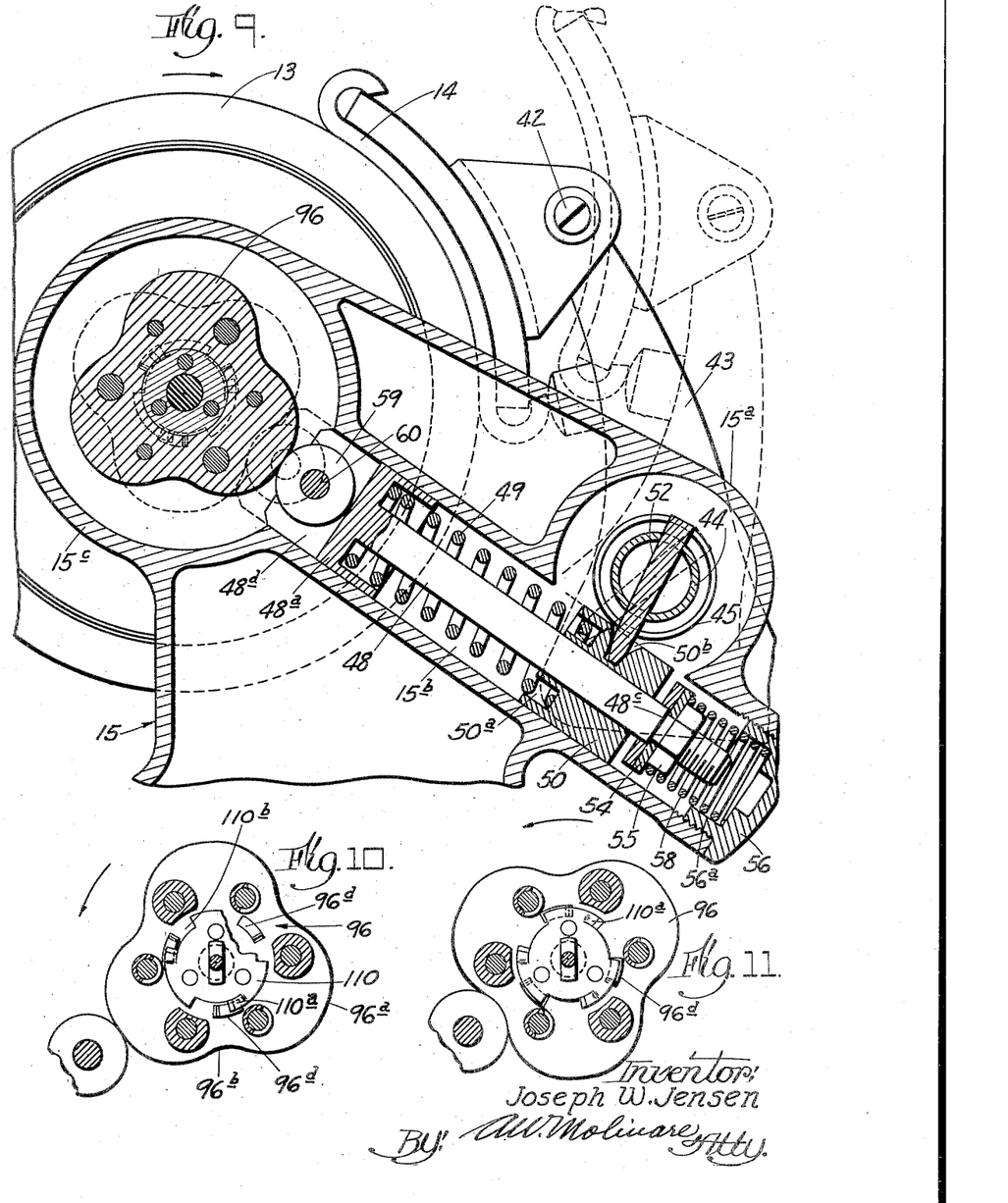
Fig. 9 is a transverse sectional view taken at line 9—9 on Fig. 3 showing the main operating cam and control elements for moving the shoe toward and from the roll.
Fig. 10 is a sectional view taken at line 10—10 on Fig. 3 showing the main operating cam for actuating the shoe and the cam means for controlling the drive connections to the roll at a position of adjustment for driving the roll.
Fig. 11 is a sectional view taken at line 11—11 on Fig. 2 showing the main operating cam in a position of adjustment at which the shoe is backed away from the roll, and the cam means for controlling the driving connections for the roll in a position at which said driving connections are disengaged and the roll is in a stationary position.

The shoe 14 which cooperates with the roll 13 and is movable into and out of engagement therewith is of elongated form and is substantially the same length as the roll 13. The face of the shoe, which engages the roll, is curved arcuately in cross-section to approximately the same curvature as the exterior surface of the roll. Said shoe is pivotally mounted on a horizontally extending pin 42 carried on an upwardly extending arm 43 disposed adjacent the longitudinal center of the roll and rigidly mounted at its lower end on the outer end of a tubular rock shaft 44 which extends parallel to the roll, the other end of said shaft extending into the rearward portion 15ª of the housing 15, as seen in Fig. 9. Surrounding said rock shaft is a tubular sleeve 45 rigidly secured at one end in said housing 15ª while its opposite end terminates adjacent said arm 43 and is supported by a foot bracket 46 secured to the top of the baseboard 12, it being understood that suitable journal means (not shown) is provided for maintaining the rock shaft centrally disposed within the tubular sleeve 45.

Said housing 15 is formed with a tubular chamber 15ᵇ substantially radial to the axis of the roll and extending in a rearward and downward direction below the rock shaft 44, as may be seen in Fig. 9. Disposed within the chamber 15ᵇ is a bolt 48 having a head 48ª, the under side of which is recessed to form a pocket for the end of a compression spring 49, the opposite end of which spring seats in a recess 50ª of an actuating block 50 which is slidably mounted on the bolt and in the tubular chamber 15ᵇ. The side wall of the block 50 is formed with an opening 50ᵇ into which extends the end of an actuating block or finger 52, rigidly secured to the end of the tubular rock shaft 44. The lower end of the bolt is reduced in cross-section to provide a shoulder 48ᶜ against which is seated a washer 54 held in place by a nut 55, and places spring 49 under compression. The lower end of the chamber 15ᵇ is closed by a threaded cap 56 formed with a recess 56ª to provide a seat for a compression coil spring 58 which circumscribes the lower end of the bolt and abuts against the washer 54.

The upper end of the head 48ª of the bolt is formed as a clevis 48ᵈ and a roller 59 is interposed between the ears of the clevis and journaled on a pin 60. When pressure is exerted against the roller 59, by means hereinafter described, the bolt 48 is urged in a downward direction and through the medium of the compression spring 49 the block 50 is urged downwardly which through the block 52 causes rotation of the rock shaft 44 swinging the arm 43 which in turn moves the shoe 14 into cooperative engagement with the roll 13. When the shoe 14 engages the roll further downward movement of the bolt 48 is permitted and the block 50 is further urged against the finger 52 by the force of the increased compression of the spring 49, thus providing resilient pressure of the shoe against the roll for insuring proper ironing or pressing operation.

The driving mechanism for moving the shoe to and from operating position with the roll and the mechanism for controlling operation of the roll in a definite timed relation to the position of the shoe are under control of a manually operating lever 62, located at the end of the housing 15, adjacent control lever 40. In lieu of or in addition to the control 62 which is actuated by the fingers of the operator, there may also be employed a foot treadle or knee treadle control, such as disclosed in my co-pending application Serial No. 83,237 filed June 3, 1936.

Figure 2:
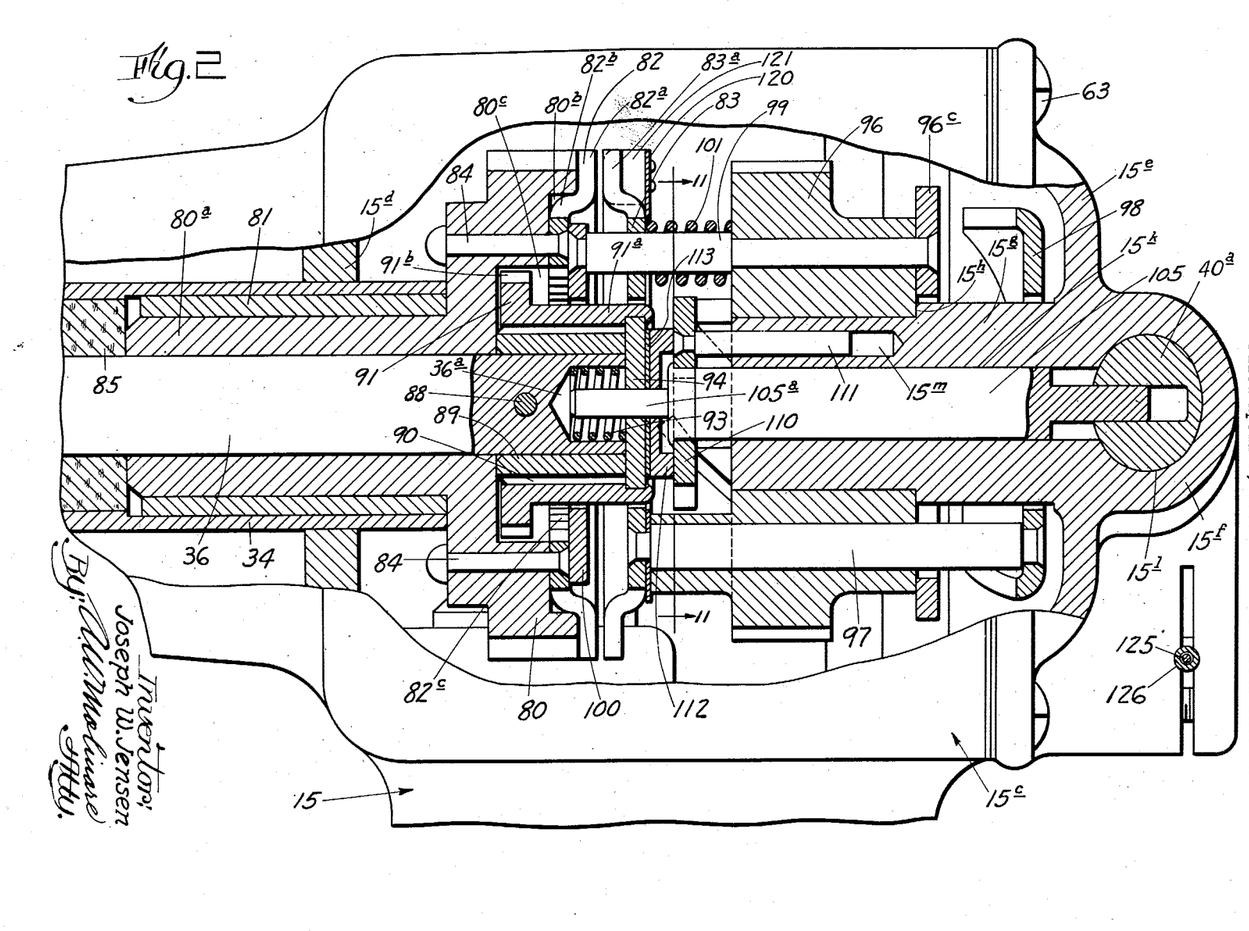
Fig. 2 is an enlarged axial sectional view of the driving and control mechanism embodying this invention, showing a position of adjustment of the mechanism at which the roll is stopped and the shoe is disposed out of cooperating engagement with the roll, taken as indicated at line 2—2 on Fig. 6.

The driving and controlling mechanism for both the roll and the shoe is disposed in a cylindrical body portion 15ᶜ of the housing 15 in substantially central registration with the axis of the roll drive shaft 36 so as to provide a convenient and compact construction capable of being economically manufactured, and capable of quick and easy repair replacement of elements of the mechanism. Said cylindrical housing portion 15ᶜ is formed with an end wall 15ᵈ through which the fixed tubular support 34 of the roll extends and is rigidly secured therein as seen in Figs. 2 and 3, while the opposite end of said housing portion 15ᶜ is inclosed by an end plate 15ᵉ secured to said body portion by screws 63.

Figure 19:
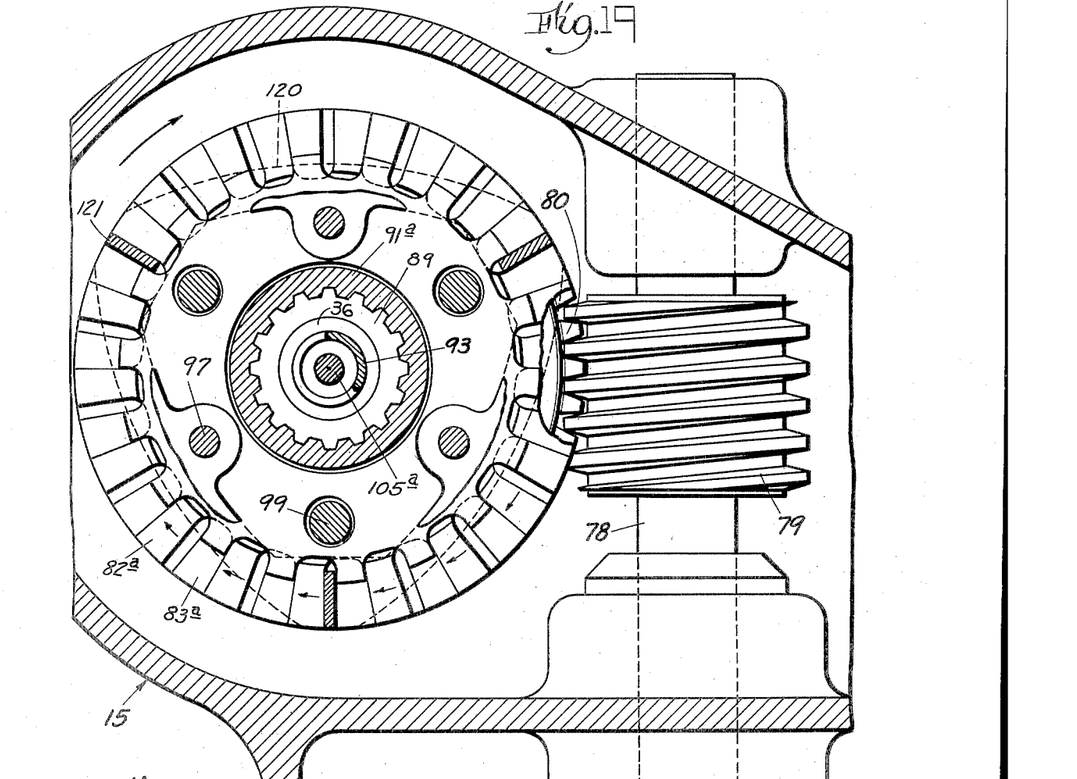
Fig. 19 is a sectional view taken as indicated at line 19—19 on Fig. 3 showing the main driving connection to the driving and control mechanism.

The drive connections to the mechanism enclosed in the housing body 15ᶜ include a pinion 75 on the upper end of a vertically disposed shaft 76 of the motor which is enclosed in the casing 16, and meshed with said pinion 75 is a gear 77 carried on the lower end of a vertically disposed drive shaft 78 journaled in bearings formed integrally with the housing portion 15ᶜ, as may be seen in Fig. 19. The upper end of said shaft 78 is provided with a worm 79 which meshes with a worm gear 80 having a hub 80ª journaled in a bearing 81 in the inner end of the fixed tubular support 34 of the roll 13 and is freely rotatable on the roll drive shaft 36. Said worm gear 80 is formed on the side opposite the hub extension 80ª with two concentric axially offset annular recesses 80ᵇ and 80ᶜ and secured to the face of the gear 80 opposite said hub is a main clutch element 82 of generally annular form, the outer marginal edge of which is formed with a multiplicity of circumferentially spaced apart fingers or jaws 82ª with which are adapted to cooperatively mesh a similar series of fingers or jaws 83ª of a cooperating main clutch element 83 which is adapted to be axially moved into and out of engagement with said clutch member 82, as hereinafter described. The inner portion of the main clutch member 82 is formed with an annular offset portion 82ᵇ seated in the recess 80ᵇ of the gear and its inner marginal edge is formed to constitute another clutch element including an internal annular series of splines or jaws 82ᶜ. Said main clutch element 82 is rigidly secured to the gear 80 by a plurality of circumferentially spaced apart rivets 84, as seen in the drawings. Said gear is limited against axial movement in one direction by the rear surface thereof abutting against the end of the tubular sleeve 34. To prevent seeping of lubricant along the roll drive 36 from the mechanism contained in the housing 15ᶜ, I provide a block of suitable material such as cork, indicated at 85, surrounding said shaft 36, and abutting against the end of the hub 80ª of said gear.

Figure 4:
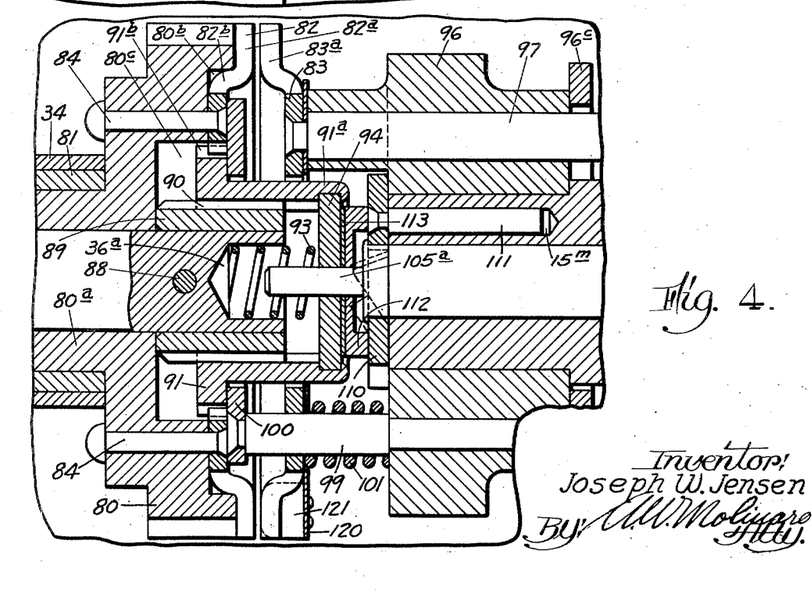
Fig. 4 is a sectional view of the driving and control mechanism as shown in Fig. 2 with the mechanism in a position of adjustment at which the roll is being rotated and the shoe is disposed in cooperating relation with said roll.

As may be seen in the drawings, the end of the roll drive shaft 36 that protrudes into the housing 15 extends inwardly beyond the face of the main gear 80, and rigidly mounted, by means of a pin 88, on said portion of the shaft and extending into said recesses 80ᵇ and 80ᶜ of the gear 80, is a sleeve 89, the end of which abuts against the inner surface of the gear in the recess 80ᶜ, for positively positioning said gear on the shaft 36 and confining it against axial movement between said sleeve 89 and the end of the tubular sleeve 34. The external surface of the sleeve 89 is formed with a multiplicity of longitudinally extending helical splines 90 on which is mounted a clutch member 91 and having cooperatively formed internal splines. The end of the roll drive shaft 36, in said housing portion 15ᶜ is formed with a recess 36ᵃ in which is seated a coil spring 93 reacting against the bottom of the recess and against an end plate 94 rigidly attached to the outer end of the hub 91ᵃ of the clutch member 91, tending to move the clutch member axially in a direction away from the gear 80. Said clutch member 91 includes an external annular series of splines or jaws 91ᵇ adapted to register with the internal series of splines or jaws 82ᶜ, of the main clutch member 82. When said clutch 91 is in the position seen in Figs. 2 and 3, the roll drive shaft 36 is inoperative, and when said clutch member is allowed to be moved axially by the coil spring 93 it assumes the position as shown in Fig. 4 in driving engagement with the internal clutch of the main clutch member 82 for rotating the roll drive shaft 36. The purpose of the helical splines 90 on the interior of the clutch member 91 and the exterior of the sleeve 89 is to cause a slight amount of rotational movement of the clutch member as it moves axially to insure relatively free axial movement thereof even when the clutch member 91 is in engagement with the internal clutch of the main clutch member 82. In other words, said clutch member 91 is capable of relatively free axial movement when it is under load, because the axial component of the load force tends to overcome the friction of the cooperating parts under load.

The end plate 15ᵉ which closes the end of the cylindrical portion 15ᶜ of the housing is formed with an outwardly projecting elongated boss 15ᶠ extending diagonally in axial alignment with the tubular chamber 15ᵇ of the housing, and in which the control element 40 extends. Extending inwardly from said end plate 15ᵉ is a centrally disposed hub 15ᵍ on which is mounted a unitary assembly of mechanism including the cooperating main clutch member 83. Said unitary mechanism includes a shoe actuating cam 96 journaled on said hub 15ᵍ and disposed in transaxial alignment with the roller 59 carried on the end of the bolt 48, which through the spring 49 actuates the shoe 14. As may be seen in the drawings, the cam 96 is of generally clover-leaf form including three high portions 96ᵃ and three low portions 96ᵇ alternating with the high portions 96ᵃ. It is to be understood that when the cam is rotated so that a high portion 96ᵃ registers with the roller 59 the bolt 48 is moved downwardly compressing the spring 49 and which through the sliding block 50 and actuating element 52 rotates the rock shaft 44 and arm 43; and moves the shoe 14 into engagement with the surface of the roll 13. And when the cam 96 is rotated so that one of the low points 96ᵇ registers with the roller 59 the bolt moves upwardly, partially by the potential energy stored in the spring 49, and by the energy of the spring 58, thus reversely rocking the shaft 44 and through the arm 43 moves the shoe 14 back away from the roll to the dotted line position, as seen in Fig. 9. The cam is fixed against axial movement on the hub 15ᵍ in one direction by abutment against a transverse shoulder 15ʰ of said hub and is prevented against axial movement in the other direction by means of fins, 99 and a thrust washer 100, abutting against the clutch member 82.

The cooperating main clutch member 83 is rigidly secured to the ends of three circumferentially spaced apart pins 97 extending parallel to the axis of rotation of the main cooperating clutch member. These pins extend slidably through and beyond the cam 96 and their outer ends are rigidly attached to a cam member 98 which, as hereinafter described, controls the axial movement of the main clutch member 83 into and out of engagement with the main clutch member 82. Extending loosely through the main cooperating clutch member 83, intermediate the pins 97, are three circumferentially spaced apart pins 99, which are rigidly secured at one end to the cam 96 and their outer ends are rigidly secured to an annular pressure plate 100 disposed forwardly of the cooperating clutch member 83, and is adapted in one position to seat in the annular offset 82ᵃ of the clutch member 82. Said pressure plate, when said unitary mechanism is assembled in the housing, is adapted to always seat against the offset portion 82ᵇ of the main clutch member 82, in registration with the internal clutch member 82ᶜ of the main clutch element 82, and thus may serve as a stop for limiting axial movement of the clutch member 91 when it is engaged with said clutch 82ᶜ, as seen in Fig. 4. Mounted on said pins 99 intermediate the cam 96 and the cooperating main clutch element 83 are compression coil springs 101 which urge said cooperating clutch member 83 in axial direction away from the cam 96.

Figure 5:
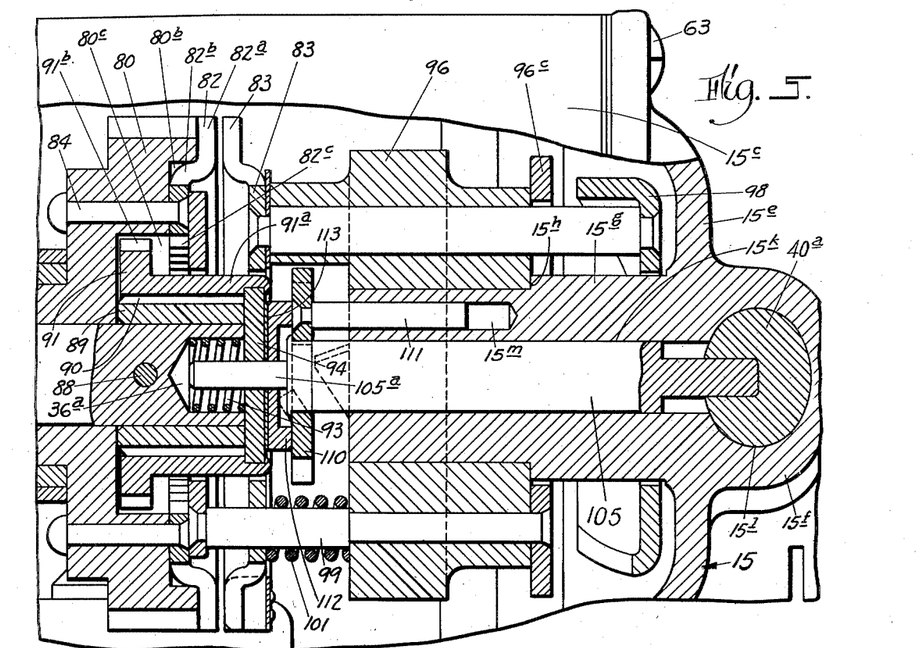
Fig. 5 is a view similar to Fig. 4 showing the mechanism in a position of adjustment at which the roll is arrested and the shoe is disposed in cooperating relation with the roll for performing a pressing operation.
Figure 7:
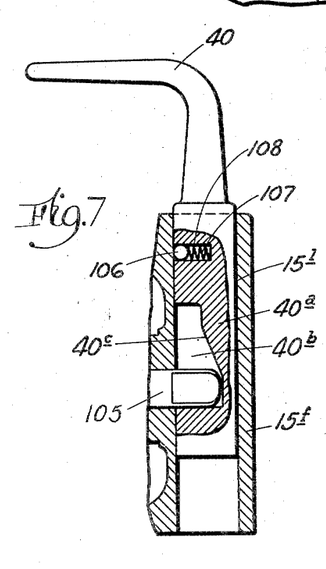
Fig. 7 is a fragmentary sectional view through the control device for the roll, taken at line 7—7 on Fig. 6 and corresponding to a position of adjustment at which the roll is adapted to be driven.
Figure 8:
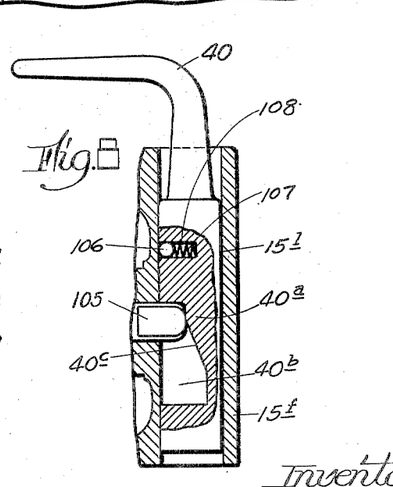
Fig. 8 is a view similar to Fig. 7, taken at line 8—8 on Fig. 6, showing the control device in a position of adjustment at which the roll drive connections are disengaged so that said roll remains stationary.

Said hub 15ᵍ of the cover plate 15ᵉ is formed with a central bore 15ᵏ in axial alignment with the roll drive shaft 36, said bore merging in a transaxially extending bore 15ˡ formed in the projection 15ᶠ for accommodating the body 40ᵃ of the manually controlled handle 40, as seen in Figs. 6 to 8. Said body 40ᵃ is formed with a recess 40ᵇ of such shape as to define an inclined cam surface 40ᶜ which cooperates with the end of an arbor 105, slidably mounted in the bore 15ᵏ, and which arbor controls engagement and disengagement of the clutch 91 for driving the roll drive shaft 36. Thus as the handle 40 is depressed from the position seen in Fig. 7 to the position seen in Fig. 8 the cam surface 40ᶜ engaging the end of the arbor 105 shifts the same axially inward for disengaging said clutch member 91, as seen in Fig. 5, and when the handle 40 is withdrawn upwardly, the arbor 105 returns to the position seen in Fig. 7 by the coiled spring 93, causing the clutch 91 to engage with internal clutch 82ᶜ for driving the roll shaft 36. To insure maintaining the control handle 40 in either desired position of adjustment, I employ a detent comprising a ball 106 and a pressure spring 107 in a recess 108 in the body 40ᵃ of the control handle 40 so as to cause the ball to exert frictional pressure against the side wall of the bore 15ˡ of the projection 15ᶠ. It will be apparent that if desired the control member 40 and body portion 40ᵃ may be formed with a cam surface reacting at the end of arbor 105 by rotational movement of said member 40.

The opposite end of the arbor 105 includes a centrally disposed pin 105ᵃ which extends through the plate 94 associated with the clutch member 91 and into the recess 36ᵃ in the end of the roll drive shaft 36. Rigidly secured to the end of the arbor and surrounding pin 105ᵃ is a cam plate 110 including three angularly disposed circumferentially spaced apart cam fingers 110ᵃ, and rigidly secured to said cam plate are three axially extending pins 111 slidably mounted in bores 15ᵐ in said hub 15ᵍ of the cover 15ᵉ, surrounding the bore 15ᵏ for the arbor 105, which in conjunction with the end of arbor 105 in body 40ᵃ prevent rotation of plate 110. These pins 111 also assist the arbor 105 in maintaining the cam plate 110 in parallel relation throughout its range of axial movement. The adjacent surface of the main cam 96 in registration with the cam fingers 110ᵃ is formed with three inclined cam surfaces 96ᵈ. Normally, when the high point 96ᵃ of the cam 96 is in registration with roller 59, the shoe 14 is in engagement with the roll, and the cam surfaces 96ᵈ are aligned with notches 110ᵇ of the cam plate 110 as seen in Fig. 10, and said plate with the arbor 105 assumes a position as seen in Fig. 4, with clutch member 91, engaged with clutch 82ᶜ for driving the roll shaft 36. Now, as cam 96 is rotated to align a low point 96ᵇ with the roller 59, the inclined surfaces of the cams 96ᵈ engage the cam fingers 110ᵃ, causing the plate 110 to move away from the cam 96 and thereby moving the arbor 105 axially to the position as seen in Fig. 2, disengaging roll clutch member 91. Interposed between the cam plate 110 and the end plate 94 of the clutch member 91, and supported on pin 105ᵃ, is a cup-shaped spacer 112 and one or more fillers 113 interposed between the spacer 112 and the end plate 94 so that pressure is positively and directly transmitted from the cam plate 110 to the clutch member 91 for moving it out of engagement with the internal clutch 82ᶜ.

Each time the control member 62 is depressed the unitary assembly including the shoe operating cam 96, the main cooperating clutch element 83, together with the cam member 98 rotates only a portion of a revolution. In the present construction the amount of rotation is limited to ⅙ of a revolution and this is indicated by the number of high and low portions 96ᵃ and 96ᵇ of the cam 96. The control which enables such limits of rotation of the assembly is accomplished by the formation of the cam 98 with six cam notches 98ᵃ equally spaced apart circumferentially in a flange 98ᵇ of the cam member 98. Cooperating with the cam member 98 is a spring detent arm 116 which is rigidly mounted on a pivot pin 117 journaled in the cover plate 15ᵉ; the outer end of said pin is secured to the manually operable control handle 62. A torsion coil spring 118 has one end anchored in the control handle and the opposite end in the cover element 15ᵉ so as to return the handle when disengaged, to normal position and thereby moving the spring detent 116 yieldingly into engagement with the cam member 98. Said spring finger 116 includes a depending finger 116ᵃ which is adapted to enter the notches forming the respective cam surfaces 98ᵃ as seen in Figs. 15 to 18, and includes a laterally extending projection 116ᵇ which is adapted to engage the end plate 96ᶜ at the end of the main cam 96 for limiting the amount of inward movement of the spring detent.

Figures 12, 13, 14, 15, 16, 17, 18:
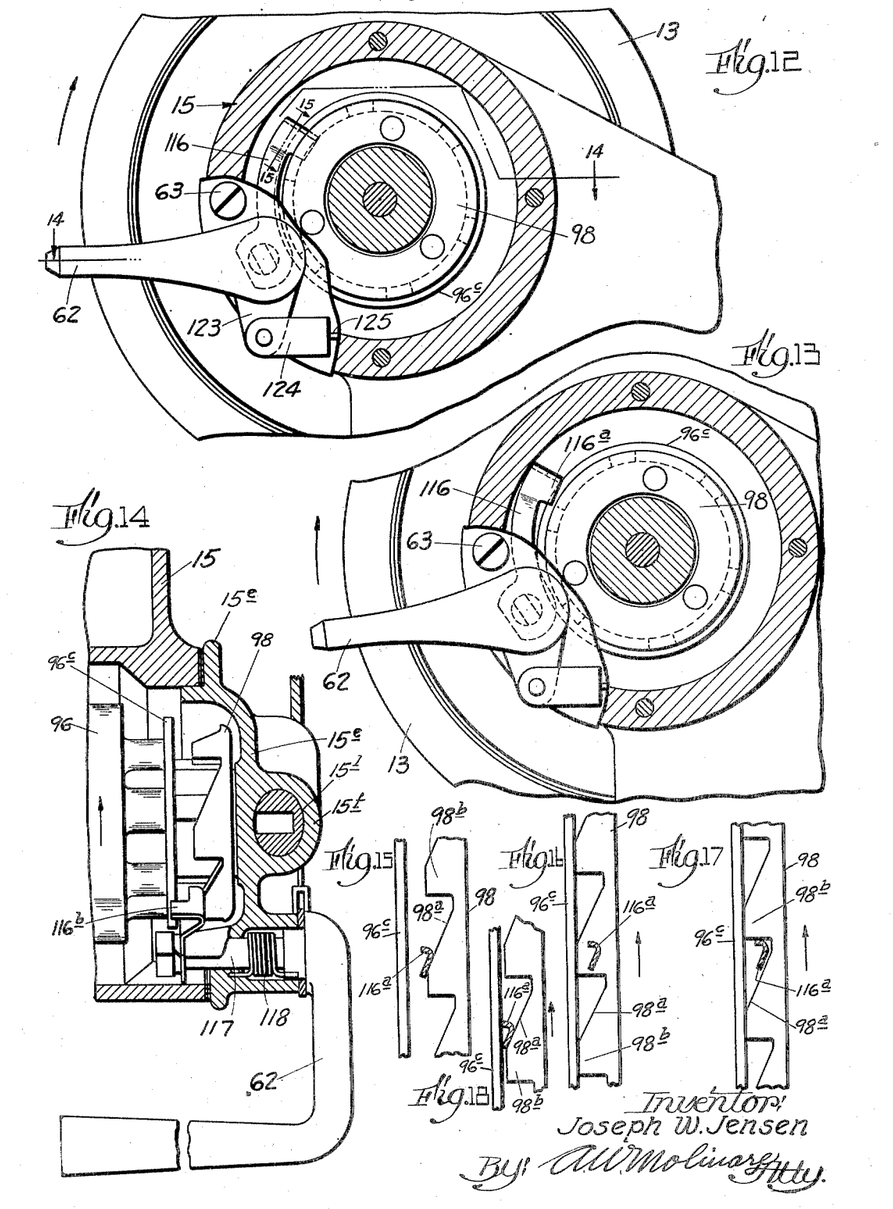
Fig. 12 is a transverse sectional view taken as indicated at line 12—12 on Fig. 3 showing the main control lever in a position of adjustment which corresponds to an adjustment of the mechanism at which the shoe is disposed in cooperating engagement with the roll.
Fig. 13 is a view similar to Fig. 12 showing the main control element in released position for setting the mechanism into operation.
Fig. 14 is a sectional view, with parts in elevation, taken as indicated at line 14—14 on Fig. 12, showing the mechanism in arrested position.
Fig. 15 is a fragmentary diagrammatic sectional view taken as indicated at line 15—15 on Fig. 12 showing the position of the main control elements after the driving mechanism has completed one cycle of operation and which may correspond to either a position at which the shoe is disposed in cooperating engagement with the roll, or when the roll is stationary and the shoe has been moved away from said roll.
Fig. 16 is a view similar to Fig. 15 showing the positions of the parts when the control member has been released to set the mechanism into operation.
Fig. 17 is a view similar to Figs. 15 and 16 showing the position of the parts after the main control member has been actuated and the mechanism is about to be disengaged after the completion of one cycle of operation.
Fig. 18 is a view similar to Fig. 17 showing the position of the parts just prior to the disengagement of the shoe actuating connections upon the completion of one cycle of operation.

Due to the coil springs 101 mounted on the pins 99, the cooperating clutch member 83 is urged in the general direction for engagement with the main clutch member 82. Such movement of the cooperating clutch member 83, by means of pins 97, tends to draw the cam member 98 toward the end of the main cam 96. In the position of the spring finger 116 and cam 98 as seen in Figs. 14 and 15, said member 98 has been moved axially in an outward direction, which through the pins 97 withdraws the cooperating clutch member 83 from engagement with the clutch member 82. In this position the unitary assembly is stationary and the shoe may be either in or out of cooperating position with the roll. Now when the spring finger 116 is withdrawn by depression of the control handle 62, as may be seen in Fig. 13, the finger 116 is disengaged from the cam member 98 and the coil springs 101 cause the main clutch member 83 to engage with the main clutch member 82 and cause rotation of the unitary assembly, and such movement of clutch member 83 moves cam member 98 inwardly to the position seen in Fig. 16. However, due to the number of cam surfaces 98ᵃ it will be apparent that when pressure is relieved on the control handle 62, the spring 118 will project the spring finger 116 toward the axis of the assembly so that when the next successive notch forming a cam surface 98ᵃ registers with said finger, said finger moves downwardly into said notch as seen in Fig. 17 and continued rotation of the cam member 98 causes the finger to cam against the cam surface 98ᵃ moving it axially outward as in Fig. 18, for withdrawing the clutch member 83 from engagement with clutch member 82 and causing arresting of the assembly, including cam 96. In this connection it is to be understood that each time the assembly is arrested either a high or low point 96ᵃ or 96ᵇ of the main cam 96 is registered with the roller 59 which through the spring 49 causes actuation of the shoe 14 with respect to the roll 13. The purpose of forming the finger 116 of spring material is so that it will build up a substantial amount of potential energy therein by being laterally deflected by the cam surface 98ᵃ while said cam 98 is rotating so that in addition to positively shifting the cam element 98 axially and moving the clutch element 83 out of engagement with clutch element 82, said potential energy of the spring finger 116 will move the cam element 98 and through the pins 97 the clutch member 83 a slight amount in addition to the movement caused by the cam action per se, to insure that the clutch member 83 is positively out of driving contact with the clutch member 82.

Figures 20, 21:
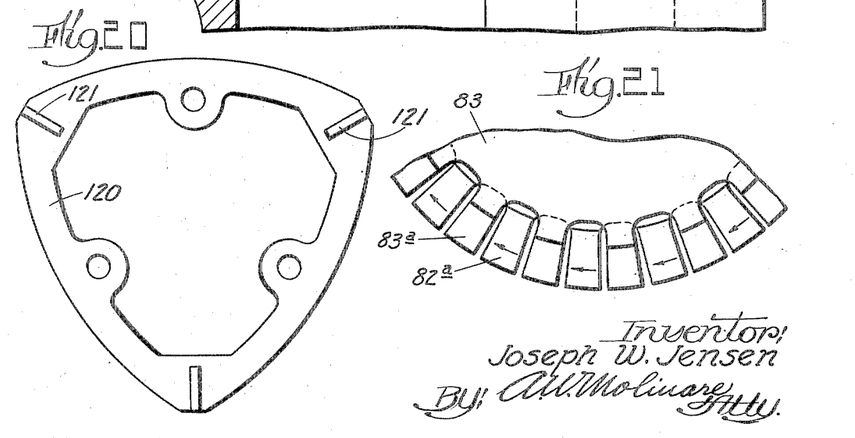
Fig. 20 is a plan view of a resilient wedging element associated with the main driving clutch.
Fig. 21 is a fragmentary view of the cooperating parts of the main driving clutch.

To insure ease of inter-engagement of the fingers of the main clutch members 82 and 83, said fingers are formed so that the space intermediate adjacent fingers of each element is of substantial size. When the main cam 96 is moved so that the high point 96ᵃ just passes beyond the roller 59, it is possible that the spring 49 tends to rotate the cam 96 in the same direction, faster than normally driven, which naturally will tend to rotate the clutch member 83 in the same direction. To eliminate the back-lash resulting from this pressure spring 49 drive action, I provide a flat spring member 120 as seen in Figs. 3, 19 and 20, which is provided with three equiannularly spaced apart wedge members 121 which are located so as to fill in the gap between a pair of inter-engaging teeth of the respective clutch members 82 and 83, and thus definitely eliminate the possibility of back-lash and the resultant wear and noise incident thereto. This flat spring element 120 for convenience is mounted on the rear side of the clutch member 83 on the pins 97, with the lugs or wedge members 121 projecting between a pair of adjacent teeth, as may be seen in the drawings.

When it is desired to control the operation of the machine remotely by foot treadle or knee treadle, such as disclosed in my co-pending application above referred to, a small arm 123 is fixedly associated with the hub of the handle 62 or the pivot pin 117 to which is pivotally connected a fitting 124 which in turn is connected to the end of a wire 125 which is slidably movable in a sheath or casing 126, it being understood that the opposite end of the wire is connected to a control of the type such as illustrated in my co-pending application for causing release of the spring detent 116 in the same manner as when actuated by finger pressure on the control member 62.

The operation of the mechanism is substantially as follows: It may be understood that when the shoe 14 is backed away from the roll to a position as seen in Fig. 9 the roll 13 is stationary and the driving and control mechanism assumes a position as seen in Fig. 2. When it is desired to perform the ironing operation the finger control 62 is depressed as in Fig. 13, causing the spring finger 116 to disengage the cam member 96 which, together with the main cooperating clutch 83 is moved axially inward by the springs 101 so that the clutch member 83 engages clutch member 82, which may be understood to be constantly rotating while the motor is being driven. The entire assembly is then rotated 1/6 revolution at which time the high point 96ª of the cam 96 is brought into registration with the roller 59 moving the bolt 48 in a downwardly oblique direction and compressing the spring 49 which in turn through the block 50 and element 52 rocks the tubular shaft 44 causing the arm 43 to move the shoe 14 into yielding pressure engagement with the roll 13 as seen in Fig. 9. At the time that the shoe arrives in contact with the roll the cam member 96 due to the spring finger 116 is again moved axially outward, simultaneously withdrawing the clutch member 83 from engagement with clutch member 82 and thereby arresting the entire unitary assembly. It is to be understood that the inclined cams 96ᵈ are so positioned that at the time that the main cam 96 is arrested and the shoe engaged as seen in Fig. 9, said cams 96ᵈ register with notches 110ᵇ in the cam plate 110 so that said cam plate permits the spring 93 to freely act on the plate 94 and shift the clutch member 91 axially to cause its splines 91ᵇ to engage the splines 82ᶜ of the internal clutch of the main clutch member 82, as seen in Fig. 4 of the drawings. In this position of the members the worm gear 80 through the clutch member 82 and clutch member 91 and sleeve 89 drives the roll shaft 36. Now, the next time that the control handle 62 is depressed to disengage the spring finger 116 the unitary assembly is rotated another 1/6 revolution, aligning a low point 96ᵇ of the cam 96 with the roller 59 which is permitted to follow up the contour of the cam, thereby relieving the pressure of the spring 49, and the shoe 14 is thereby backed away from the roll 13 by the compression spring 58 acting directly on the bolt 48. In this connection, however, it is to be noted that almost instantaneously upon initiating rotary movement of the unitary assembly by the second manipulation of the control member 62 the cam fingers 110ᵃ commence to ride on the cam surfaces 96ᵈ, associated with the main cam 96, and through the washer 112, fillers 113 and plate 94, moves the clutch member 91 rearwardly out of engagement with the internal clutch 82ᶜ of clutch member 82, to the position seen in Fig. 3. In other words, the roll 13 is arrested substantially at the time or slightly prior to the shoe moving away from the roll 13.

When it is desired to use the ironer for pressing fabrics the roll 13 is caused to remain stationary, and this is accomplished by depressing the control handle 40 to the position as seen in Fig. 8, and in such movement the cam surface 40ᶜ of the body 40ª acting camwise on the end of the arbor 105 shifts it inwardly and thereby moves the clutch plate 110 and through the washers 112 and 113 the plate 94 with the clutch member 91 to the position seen in Fig. 5, against the reaction of spring 93. It is to be understood that while the control member 40 is in such depressed state the operation of the control lever 62 merely moves the shoe into or out of cooperating pressing relation with the roll. It is also to be understood that the control member 40 may be operated at any time during the ironing operation. In other words, if the operator observes that a certain area of the fabric being ironed is exceedingly damp the roll 13 may be promptly arrested for a short period of time and then again set in motion as desired.

Although I have herein shown and described a preferred embodiment of my invention, manifestly it is capable of modification and rearrangement of parts without departing from the spirit and scope thereof. I do not, therefore, wish to be understood as limiting this invention to the precise embodiment herein disclosed except as it may be so limited by the appended claims.

I claim:

1. A drive mechanism for an ironing machine of the type including a rotatable roll shaft, an ironing roll mounted on the shaft for rotation therewith, and a power actuated shoe movable into and out of cooperating relation with the roll, said mechanism comprising a drive shaft, a gear loosely mounted on the roll shaft and driven by the drive shaft, disengageable driving connections between the roll shaft and gear and disposed coaxially with said gear, means including an operating element disposed coaxially with and driven by said gear for moving the shoe into and out of cooperating relation with the roll, and time delay means including an operating element connected to and movable with said first mentioned means and coacting with said coaxial roll shaft driving connections and said first mentioned means for disengaging the drive to said roll shaft immediately prior to movement of the shoe out of cooperating relation with the roll.

2. A drive mechanism for an ironing machine of the type including a rotatable roll shaft, an ironing roll mounted on the shaft for rotation therewith, and a power actuated shoe movable into and out of cooperating relation with the roll, said mechanism comprising a drive shaft, a gear loosely mounted on the roll shaft and driven by the drive shaft, disengageable driving connections between the roll shaft and gear and disposed coaxially with said gear, means including an operating element disposed coaxially with and driven by said gear for moving the shoe into and out of cooperating relation with the roll, and time delay means including an operating element connected to and movable with said first mentioned means and coacting with said roll shaft driving connections and said first mentioned means for causing rotation of said roll shaft immediately subsequent to contacting engagement of said shoe with the roll.

3. A drive mechanism for an ironing machine of the type including a rotatable roll shaft, an ironing roll mounted on the shaft for rotation therewith, and a power actuated shoe movable into and out of cooperating relation with the roll, said mechanism comprising a drive shaft, a gear loosely mounted on the roll shaft and driven by the drive shaft, disengageable driving connections between the roll shaft and gear and disposed coaxially with said gear, means including an operating element disposed coaxially with and driven by said gear for moving the shoe into and out of cooperating relation with the roll, and time delay means including an operating element connected to and movable with said first mentioned means and interconnecting and coacting with said coaxial roll shaft driving connections and said first mentioned means for disengaging the drive to said roll shaft immediately prior to movement of the shoe out of cooperating relation with the roll, and rendering said roll shaft driving connections operative immediately subsequent to contacting engagement of said shoe with the roll.

4. A drive mechanism for an ironing machine of the type including a rotatable roll shaft, an ironing roll mounted on the shaft for rotation therewith, and a power actuated shoe movable into and out of cooperating relation with the roll, said mechanism comprising a drive shaft, a gear loosely mounted on the roll shaft and driven by the drive shaft, disengageable driving connections between the roll shaft and gear and disposed coaxially with said gear, means including an operating element disposed coaxially with and driven by said gear for moving the shoe into and out of cooperating relation with the roll, means for automatically arresting said shoe operating means when said shoe arrives at either its operative or inoperative position, and time delay means including an operating element connected to and movable with said first mentioned means and coacting with said roll shaft driving connections and said first mentioned means, for automatically rendering said roll shaft driving connections operative immediately subsequent to contacting engagement of the shoe with the roll.

5. A drive mechanism for an ironing machine of the type including a rotatable roll shaft, an ironing roll mounted on the shaft for rotation therewith, and a power actuated shoe movable into and out of cooperating relation with the roll, said mechanism comprising a drive shaft, a gear loosely mounted on the roll shaft and driven by the drive shaft, disengageable driving connections between the roll shaft and gear and disposed coaxially with said gear, means including an operating element disposed coaxially with and driven by said gear for moving the shoe into and out of cooperating relation with the roll, means for automatically arresting said shoe operating means when said shoe arrives at either its operative or inoperative position, and time delay means including an operating element connected to and movable with said first mentioned means and coacting with said roll shaft driving connections and said first mentioned means, for automatically rendering said roll shaft driving connections inoperative, immediately prior to movement of the shoe out of cooperating relation with the roll.

6. A drive mechanism for an ironing machine of the type including a rotatable roll shaft, an ironing roll mounted on the shaft for rotation therewith, and a power actuated shoe movable into and out of cooperating relation with the roll, said mechanism comprising a drive shaft, a gear loosely mounted on the roll shaft and driven by the drive shaft, disengageable driving connections between the roll shaft and gear and disposed coaxially with said gear, means for moving the shoe into and out of cooperating relation with said roll, including linkage, spring means acting on said linkage for moving the shoe, a cam mounted coaxial with said gear and positioned for coaction with said shoe operating linkage, and a clutch for disengageably connecting said cam and gear for rotation as a unit, means disposed coaxially with said gear and cam for automatically disengaging said clutch when the shoe arrives at either its operative or inoperative position, and coaxial means rendered operative in direct response to the rotation of the cam for controlling the operation of the driving connections between said roll shaft and gear.

7. A drive mechanism for an ironing machine of the type including a rotatable roll shaft, an ironing roll mounted on the shaft for rotation therewith, and a power actuated shoe movable into and out of cooperating relation with the roll; said mechanism comprising a drive shaft, a gear loosely mounted on the roll shaft and driven by the drive shaft, disengageable driving connections between the roll shaft and gear, means for moving the shoe into and out of cooperating relation with said roll shaft, a driving clutch member connected to the gear, a unitary rotatable assembly mounted coaxially with said gear and comprising a cam positioned for actuating said shoe moving means, a driven clutch member engageable with said driving clutch member, cam means for controlling the period of engagement of said clutch members and the amount of rotation of the unitary assembly, and a manually operable spring detent for controlling said cam means, and adapted to be tensioned upon rotation of said cam means to build up potential energy therein, for moving said clutch members a substantial distance apart when the clutch members are disengaged.

8. A drive mechanism for an ironing machine of the type including a rotatable roll shaft, an ironing roll mounted on the shaft for rotation therewith, and a power actuated shoe movable into and out of cooperating relation with the roll; said mechanism comprising a drive shaft, a gear loosely mounted on the roll shaft and driven by the drive shaft, disengageable driving connections between the roll shaft and gear, means for moving the shoe into and out of cooperating relation with said roll, a driving clutch member connected to the gear, a unitary rotatable assembly mounted coaxially with said gear comprising a cam positioned for actuating said shoe moving means, a driven clutch member engageable with said driving clutch member, manually releasable cam means for controlling the period of engagement of said clutch members and the amount of rotation of the unitary assembly, and means actuated in direct response to the rotation and position of rotative adjustment of said assembly for controlling the operation of the driving connections between said roll shaft and gear.

9. A drive mechanism for an ironing machine of the type including a rotatable roll shaft, an ironing roll mounted on the shaft for rotation therewith, and a power actuated shoe movable into and out of cooperating relation with the roll; said mechanism comprising a drive shaft, a gear loosely mounted on the roll shaft and driven by the drive shaft, disengageable driving connections between the roll shaft and gear, means for moving the shoe into and out of cooperating relation with said roll, a driving clutch member connected to the gear, a unitary rotatable assembly mounted coaxially with said gear and comprising a cam positioned for actuating said shoe moving means, a driven clutch member engageable with said driving clutch member, manually releasable cam means for controlling the period of engagement of said clutch members and the amount of rotation of the unitary assembly, and means actuated in direct response to the rotation and position of rotative adjustment of said assembly for controlling the operation of the driving connections between said roll shaft and gear, said driving connections including jaw clutch members, one of which is formed integral with said driving clutch member.

10. A drive mechanism for an ironing machine of the type including a rotatable or roll shaft, an ironing roll mounted on the shaft for rotation therewith, and a power actuated shoe movable into and out of cooperating relation with the roll, said mechanism comprising a drive shaft, a gear loosely mounted on the roll shaft and driven by the drive shaft, disengageable driving connections between the roll shaft and gear, means for moving the shoe into and out of cooperating relation with said roll, a driving clutch member connected to the gear, a unitary rotatable assembly mounted coaxially with said gear comprising a cam positioned for actuating said shoe moving means, a driven clutch member engageable with said driving clutch member, manually releasable cam means for controlling the period of engagement of said clutch members and the amount of rotation of the unitary assembly, means actuated in direct response to the rotation and position of rotative adjustment of said assembly for controlling the operation of the driving connections between said roll shaft and gear, said driving connections including jaw clutch members one of which is formed integral with said driving clutch member, spring means normally urging one of said jaw clutch members into engagement with the other, and manually operable means, independent of said cam means, for positively shifting one of said jaw clutch members out of engagement with the other, against the reaction of said spring means, for arresting said roll shaft.

11. A drive mechanism for an ironing machine of the type including a rotatable roll shaft, an ironing roll mounted on the shaft for rotation therewith, and a power actuated shoe movable into and out of cooperating relation with the roll; said mechanism comprising a drive shaft, a gear loosely mounted on the roll shaft and driven by the drive shaft, disengageable driving connections between the roll shaft and gear, means for moving the shoe into and out of cooperating relation with said roll, a driving clutch member connected to the gear, a unitary rotatable assembly mounted coaxially with said gear comprising a cam positioned for actuating said shoe moving means, a driven clutch member engageable with said driving clutch member, manually releasable cam means for controlling the period of engagement of said clutch members and the amount of rotation of the unitary assembly, means actuated in direct response to the rotation and position of rotative adjustment of said assembly for controlling the operation of the driving connections between said roll shaft and gear, said driving connections including jaw clutch members one of which is formed integral with said driving clutch member, and a pressure plate rigidly connected to said shoe actuating cam and positioned adjacent the combined driving clutch member and jaw clutch member to serve as a stop for the other jaw clutch member.

12. A drive mechanism for an ironing machine of the type including a rotatable roll shaft, an ironing roll mounted on the shaft for rotation therewith, and a power actuated shoe movable into and out of cooperating relation with the roll, said mechanism comprising a drive shaft, a gear loosely mounted on the roll shaft and driven by the drive shaft, disengageable driving connections between the roll shaft and gear, means for moving the shoe into and out of cooperating relation with said roll, a driving clutch member connected to the gear, a unitary rotatable assembly mounted coaxially with said gear comprising a cam positioned for actuating said shoe moving means, a driven clutch member engageable with said driving clutch member, said driving and driven clutch members each including a multiplicity of circumferentially spaced-apart interengaging fingers, the space between adjacent fingers being substantially greater than the width of fingers of the other clutch member, spring pressed wedge means movable, when said members are engaged, into one or more of said spaces to wedge the cooperating fingers of the members together, to prevent back-lash, and manually releasable cam means for controlling the period of engagement of said clutch members and the amount of rotation of the unitary assembly.

13. A drive mechanism for an ironing machine of the type including a rotatable roll shaft, an ironing roll mounted on the shaft for rotation therewith, and a power actuated shoe movable into and out of cooperating relation with the roll; said mechanism comprising a housing, a drive shaft, a gear loosely mounted on the roll shaft and driven by the drive shaft, disengageable driving connections between the roll shaft and gear, means for moving the shoe into and out of cooperating relation with said roll, a driving clutch member connected to the gear, said housing including a cover plate having a hub disposed in axial alignment with said gear, a unitary rotatable assembly mounted on said hub coaxially with said gear and comprising a cam positioned for actuating said shoe moving means, a driven clutch member engageable with said driving clutch member, and manually releasable cam means for controlling the period of engagement of said clutch members and the amount of rotation of the unitary assembly.

14. A drive mechanism for an ironing machine of the type including a rotatable roll shaft, an ironing roll mounted on the shaft for rotation therewith, and a power actuated shoe movable into and out of cooperating relation with the roll; said mechanism comprising a housing including a cover plate at one end provided with an inwardly extending hub disposed in axial alignment with the roll shaft, a drive shaft, a gear journaled on the roll shaft and driven by the drive shaft, disengageable driving connections between the roll shaft and gear, means for moving the shoe into and out of cooperating relation with said roll, a driving clutch member connected to the gear, a unitary rotatable assembly mounted on said hub coaxially with said gear and comprising a cam positioned for actuating said shoe moving means, a driven clutch member engageable with said driving clutch member, spring means for urging the driven clutch member into cooperating engagement with the driving clutch member, and manually controlled cam means for withdrawing the driven clutch member from engagement with the driving clutch member, said cam means being constructed and arranged so that upon each manual actuation causes arresting of said assembly after a predetermined amount of rotation by such clutch members, whereby said predetermined amount of rotation of said shoe operating cam moves the shoe into cooperative relation with the roll, and the next successive actuation of the manually controlled cam means permits a further predetermined amount of rotational movement of said cam causing the shoe to move out of cooperative relation with the roll, said driving connections, including cooperating jaw clutch members, one of which is formed integrally with said driving clutch member, and the other being splined on the roll shaft, and spring means for urging the latter into engagement with the former, and means actuated in response to the rotation and position of rotative adjustment of said assembly for controlling the engagement and disengagement of said jaw clutch members.

JOSEPH W. JENSEN.